United States Patent [19]
Ota et al.

[11] Patent Number: 4,732,844
[45] Date of Patent: Mar. 22, 1988

[54] METHOD FOR MANUFACTURING OPTICAL DISK WITH ADDRESS AND GUIDE GROOVES

[75] Inventors: Minemasa Ota; Osamu Kumasaka, both of Saitama, Japan

[73] Assignee: Pioneer Electronic Corporation, Tokyo, Japan

[21] Appl. No.: 701,268

[22] Filed: Feb. 13, 1985

[30] Foreign Application Priority Data

Feb. 13, 1984 [JP] Japan ................................ 59-23010

[51] Int. Cl.$^4$ ................................................ G03C 5/00
[52] U.S. Cl. ...................................... 430/322; 430/323; 430/325; 430/327; 430/394; 430/945; 346/76 L
[58] Field of Search ............... 430/945, 323, 312, 322, 430/325, 327, 394; 346/76 L

[56] References Cited

U.S. PATENT DOCUMENTS 4,109,045 8/1978 Goshima et al. .................... 428/212
4,387,381 6/1983 Bell .................................. 346/135.1

Primary Examiner—John E. Kittle
Assistant Examiner—José G. Dees
Attorney, Agent, or Firm—Sughrue, Mion, Zinn, Macpeak and Seas

[57] ABSTRACT

A method for manufacturing an optical disk having both address pits and guide grooves having accurately controlled depths and widths. Two different types of sensitive materials of different characteristics are applied to a recording original board to form inner and outer layers thereon. The inner and outer layers are exposed and partially removed independently of each other so that the depth and width of the guide grooves and address pits can be set to desired values with high accuracy.

5 Claims, 15 Drawing Figures

METHOD FOR MANUFACTURING OPTICAL DISK WITH ADDRESS AND GUIDE GROOVES

BACKGROUND OF THE INVENTION

The present invention relates to a method for manufacturing a so-called after-recording or DRAW (Direct Read After Write) type optical disk on which the user can write data, especially, an optical disk with address pits and guide grooves.

An example of an after-recording type optical disk is shown in FIG. 1, which is a sectional view with parts cut away. In FIG. 1, reference character A designates a spacer; B, a space; C, a substrate; D, a recording material; E, a data part (user bits); F, an address part in which track addresses, etc., are recorded; and J, guide grooves. The pits in the address part F (hereinafter referred to as address pits) and the guide grooves are formed by the manufacturer, while the user pits are recorded by the user. In the area of the user pits in FIG. 1, reference character H designates a region in which no data has been recorded, and G, recorded pits.

In the optical disk with addresses and guide grooves, in order to maximize tracking signals, in general, the guide groove depth is set to $\lambda/8n$ (where $\lambda$ is the wavelength of a recording and reproducing light beam and n is the refractive index of the substrate) while the address bit is set to $\lambda/4n$ so that the reflected light is maximum in contrast.

Heretofore, an optical disk of this type has been manufactured as follows: As shown in FIG. 2, a light beam from a laser beam source 1, which is a photoresist exposing light source, is modulated by an electrical and optical modulator (hereinafter referred to as an E/O modulator) 2, and the modulated beam is reflected by a reflecting mirror towards a focusing lens 3.

In FIG. 2, reference numeral 4 designates a recording original board made of glass or the like the surface of which is polished; 5, a photoresist layer having a thickness of about $\lambda/4$; and 6, an electric motor for rotating the recording original board 4.

FIG. 3 is a graph indicating amounts of exposure to the photoresist layer 5 with resulting percentage of film (photoresist material) remaining after developing. With the amount of exposure L, the percentage of film remaining is 0%. With the amount of exposure K, the percentage of film remaining is 50%.

When the recording light beam (light spot), after being modulated to a light output corresponding to the amount of exposure K for the guide groove J and to a light output corresponding to the amount of exposure L for the address part F, is applied to the recording original board 4 as shown in FIG. 4, an optical disk is produced with addresses and guide grooves in which the guide groove depth is one-half of the address pit depth.

In the above-described method, with the amount of exposure L with which the percentage of the photoresist layer 5 remaining is 0%, the formed groove has a flat bottom as shown in FIG. 5B. However, since the light source is a laser beam having a Gaussian distribution, the method is disadvantageous in that, even if the amount of exposure K is provided for the center of the light spot is proper, due to the unavoidable intensity decrease radially of the center, the guide groove formed upon developing is actually round in section, as shown in FIG. 5A.

Furthermore, when the amount of exposure is slightly changed rom the value K, the percentage of film remaining is greatly changed, as a result of which it is difficult to control the guide groove's depth with high accuracy.

If the section has a width $W_A$ at half of the maximum depth when the amount of exposure K is employed and a width $W_B$ when the amount of exposure L is employed, the width $W_B$ is smaller than the width $W_A$ at all times ($W_A < W_B$). Therefore, it is impossible to form a guide groove in which the upper part is smaller in width than the lower part.

SUMMARY OF THE INVENTION

In view of the foregoing, the invention provides a method for manufacturing an optical disk with addresses and guide grooves in which two kinds of photosensitive materials, different in characteristics, are applied to a recording original board to form inner and outer layers thereon. The inner and outer layers are exposed and partially removed independently of each other so that the depths and widths of guide grooves and address pits can be set to desired values with high accuracy.

DESCRIPTION OF THE PREFERRED EMBODIMENTS

The invention will now be described with reference to preferred embodiments.

Figure 6:
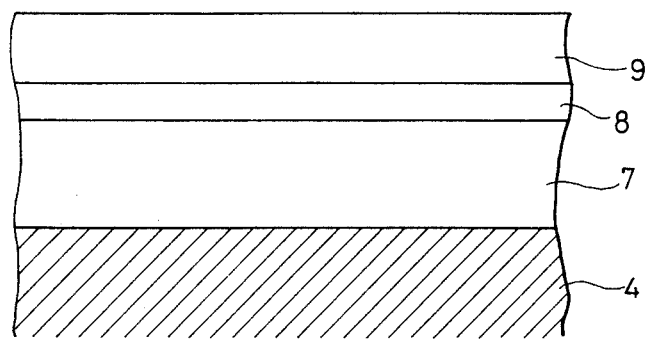
FIG. 6 is a sectional view showing a recording original board in a first embodiment of this invention.

As shown in FIG. 6, a photoresist layer 7, an intermediate layer 8, and a photoresist layer 9 are formed on a recording original board 4 in the stated order. The photoresist layer 7 is lower in sensitivity to a recording light wavelength than the photoresist layer 9. For instance, the photoresist layer 7 can be made of a chemical OFPR II manufactured by Tokyo Okakogyo Co. of Japan, and the photoresist layer 9 can be made of a chemical OFPR 800 manufactured by the same company.

The intermediate layer 8 is provided so that, when the photoresist layer 9 is formed over the photoresist layer 7, solvent from the photoresist layer 9 cannot affect the photoresist layer 9. The intermediate layer 8 should be high in transmissivity; that is, the transmission of the recording light beam to the photoresist layer 7 should not be hindered by the intermediate layer 8 while the recording light beam is applied to the guide groove part and the address part. For this purpose, the intermediate layer 8 may be made of SiO or $SiO_2$, for instance. In this case, it is desirable that the intermediate layer 8 be sufficiently resistive against the solvent, and it should be 20 to 500 Å, preferably 50 to 300 Å, in thickness so that it is isotropic during etching. The SiO or $SiO_2$ layer may be formed by sputtering or vacuum deposition.

Figure 7:
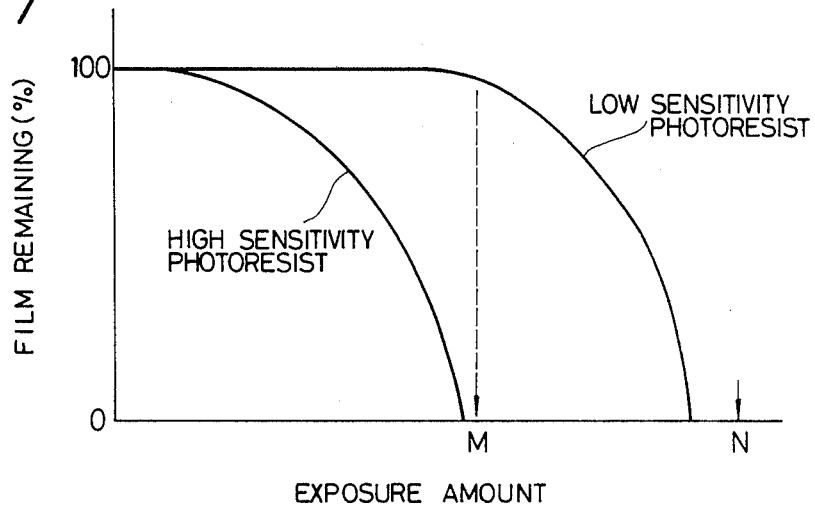
FIG. 7 is a diagram showing percentage of film remaining after exposure and developing for two different photoresists used in the first embodiment of the invention.
Figure 8:
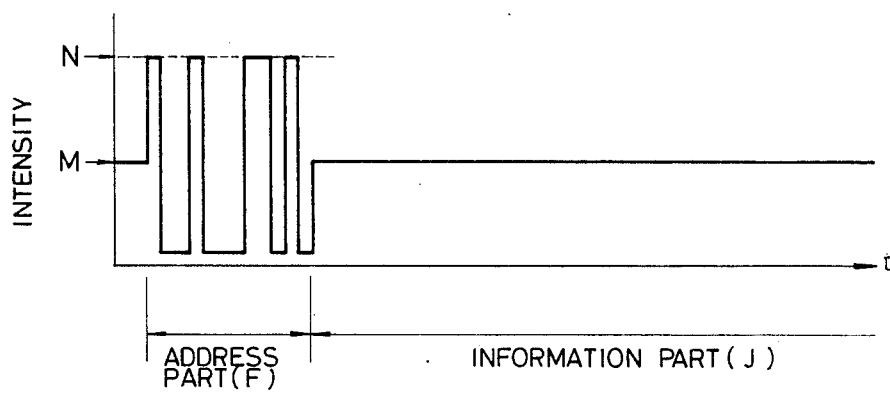
FIG. 8 is a diagram showing optical outputs used in forming address pits and guide grooves in the first embodiment of the invention.

The percentages of film remaining after exposure and developing of the photoresist layers 7 and 9 are as indicated in FIG. 7. As shown in FIG. 8, a light output corresponding to the amount of exposure M is applied to the guide groove part, and a light output corresponding to the amount of exposure N is applied to the address pit part. In this case, the amount of the photoresist layer 9 remaining with the light outputs corresponding to the amounts of exposure M and N is 0%, and the amount of the photoresist layer 7 remaining is 0% with the light output corresponding to the amount of exposure N and about 100% with the light output corresponding to the amount of exposure M.

Figure 9:
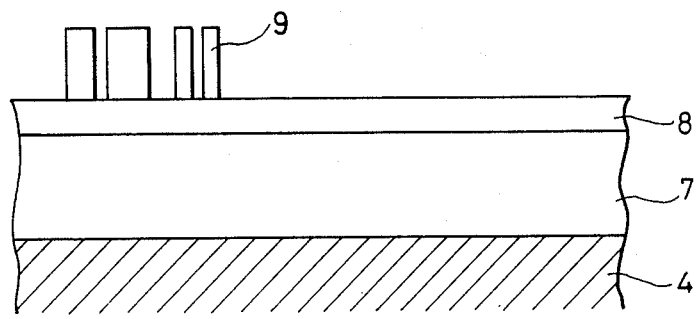
FIG. 9 is a sectional view for a description of exposure and first development steps in the first embodiment of the invention.
Figure 10:
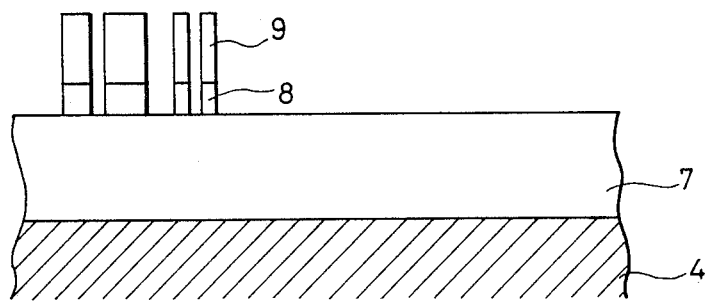
FIG. 10 is a sectional view for a description of the partial removal of an intermediate layer in the first embodiment of the invention.

As described above, the photoresist layer 9 yields a remaining rate of 0% with the light outputs corresponding to the amounts of exposure M and N. Therefore, when the recording original board 4 exposed as shown in FIG. 8 is developed, the photoresist layer 9 is partially removed as shown in FIG. 9. Then, the intermediate layer 8 is also partially removed using the remaining photoresist layer 9 as a mask. In the case where the intermediate layer 8 is an SiO film, the above-described operations can be achieved by gently etching it with an ammonium fluoride solution, which is relatively low in corrosiveness. As a result, the depth of the guide groove and the address pits is increased in an amount equal to the thickness of the intermediate layer 8, as shown in FIG. 10.

The recording original board is developed again. As a result, of the photoresist layer 7, only the parts to which the light output corresponding to the amount of exposure N is applied and having a remaining rate of 0% are removed. That is, the depth of the address pits is larger than that of the guide groove part. The amount of increase in depth is equal to the sum of the thickness of the photoresist layer 9 and the thickness of the intermediate layer 8.

If both the thickness of the photoresist layer 7, and the sum of the thickness of the intermediate layer 8 and the photoresist layer 9 are made equal to $\lambda/8n$, then an optical disk most suitable for reading tracking data and address data can be produced.

In the above-described embodiment of the invention, the intermediate layer 8 is provided between the photoresist layers 7 and 9. However, if the solvents of the photoresist layers 7 and 9 are different from each other and the solvent of the photoresist layer 9 does not affect the photoresist layer 7, the intermediate layer 8 may be eliminated. If, in this connection, photoresist layers which can be treated with the same developing solution are employed as the photoresist layers 7 and 9, then the number of times of developing the recording original board can be reduced to one, and the manufacturing process simplified as much.

The above-described embodiment of the invention utilizes the difference in sensitivity to a recording light wavelength between two photoresist layers. However, a difference in spectral sensitivity may be employed to manufacture an optical disk with address and guide grooves. A second embodiment of the invention is based on this technical concept.

In the second embodiment, photoresist having a spectral sensitivity on the short wavelength side, such as benzoquinone diazide photoresist, available, for instance, as the product AZ-111 of Hoeschst Co., is employed to form the photoresist layer 7, and a photoresist having a spectral sensitivity on the long wavelength side, such as naphthoquinone diazide photoresist, available, for instance, as the product AZ-1350 of the same company, is employed to form the photoresist layer 9.

Figure 13:
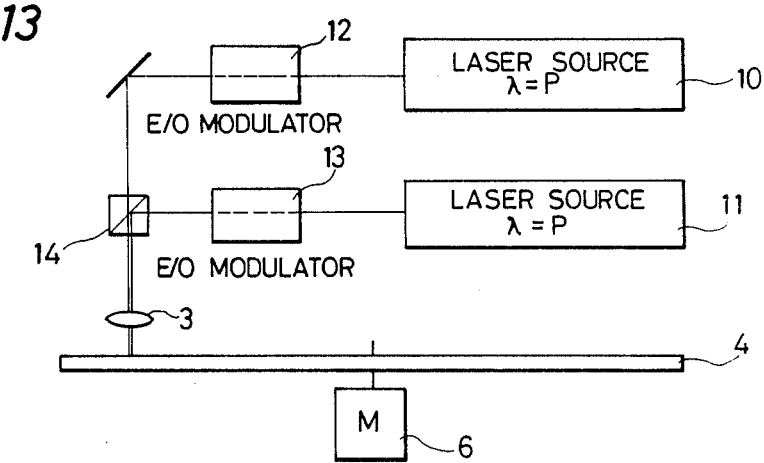
FIG. 13 is a block diagram of a recording apparatus used in the second embodiment of the invention.
Figure 14:
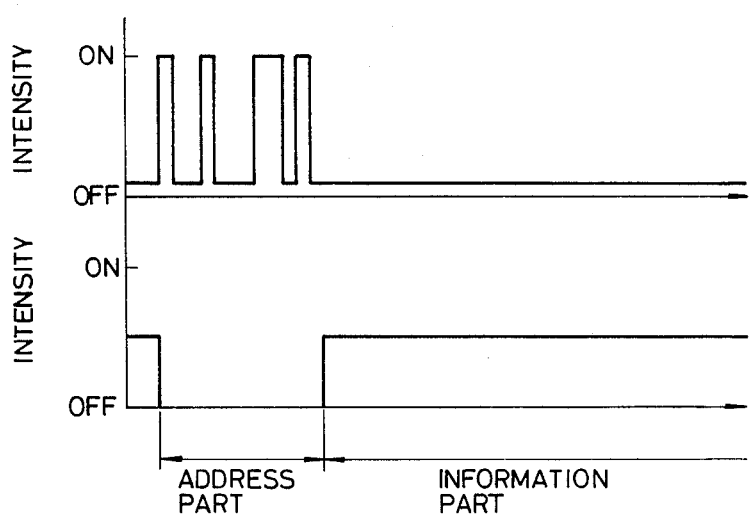
FIG. 14 is a diagram indicating optical outputs used to form address pits and guide grooves in the second embodiment of the invention.

The recording original board is subjected to exposure by a recording apparatus having optical systems as shown in FIG. 13. In the recording apparatus shown in FIG. 13, the laser beam emitted by a long wavelength laser source 10 is applied through an E/O modulator 12 to a mirror. The laser beam thus applied is reflected by the mirror, and is then applied through a beam splitter 14 to a focusing lens. The laser beam emitted by a short wavelength laser source 11 is applied through an E/O modulator 13 to the beam splitter 14. The laser beam thus applied is reflected and applied to the focusing lens 3.

Figure 1:
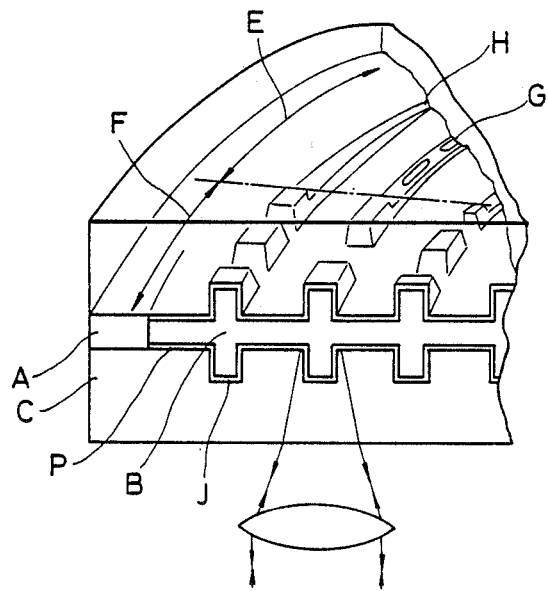
FIG. 1 is a sectional view of an after-recording type optical disk with address and guide grooves.
Figure 2:
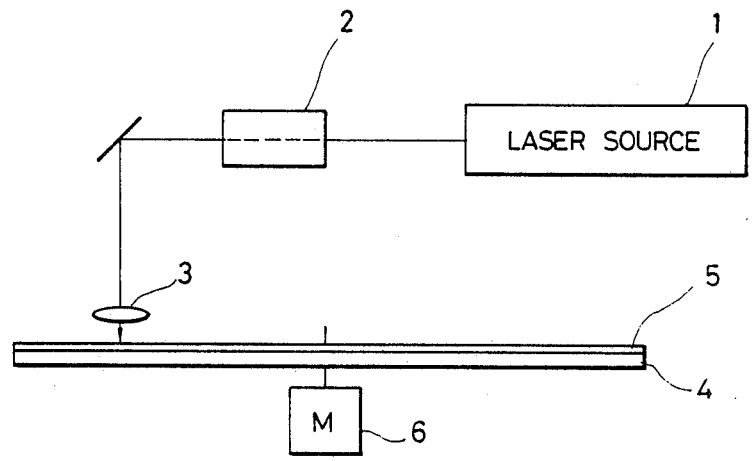
FIG. 2 is a block diagram of a conventional apparatus adapted to form an address part and a guide groove part.
Figure 3:
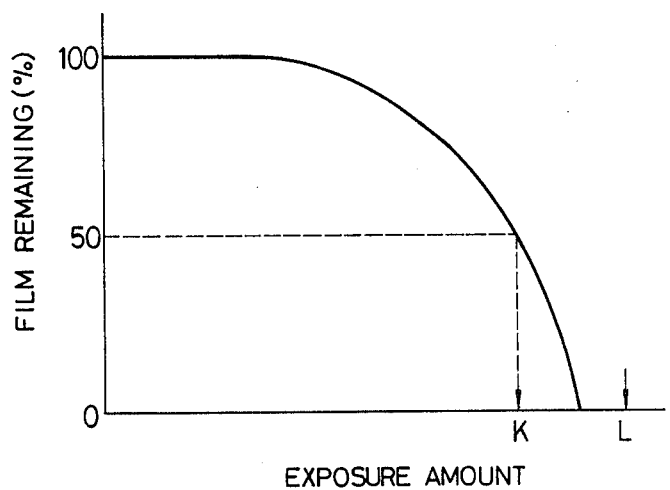
FIG. 3 is a graphical representation indicating amounts (percentages) of photoresist remaining after exposure and developing as a function of an amount of exposure.
Figure 4:
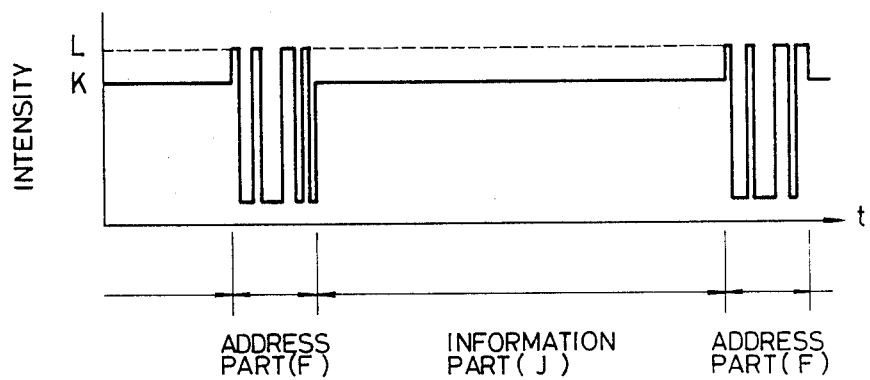
FIG. 4 is a diagram showing optical outputs which are used to form address parts and guide groove parts in an optical disk to provide address pits and guide grooves according to a conventional method.
Figure 5A:
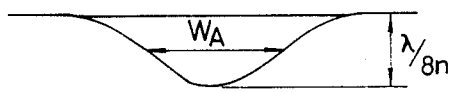
FIGS. 5A and 5B are sectional views showing an address pit and a guide groove which are formed according to the conventional method.
Figure 5B:
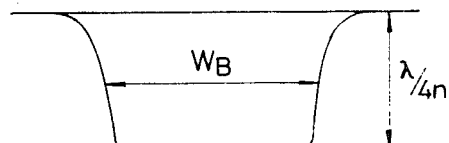

In order for the guide grooves to be formed by the long wavelength laser beam and the address pits to be formed by the short wavelength laser beam, the laser beams, after being modulated with signals as shown in FIG. 4, are applied to the photoresist layers.

Figure 11:
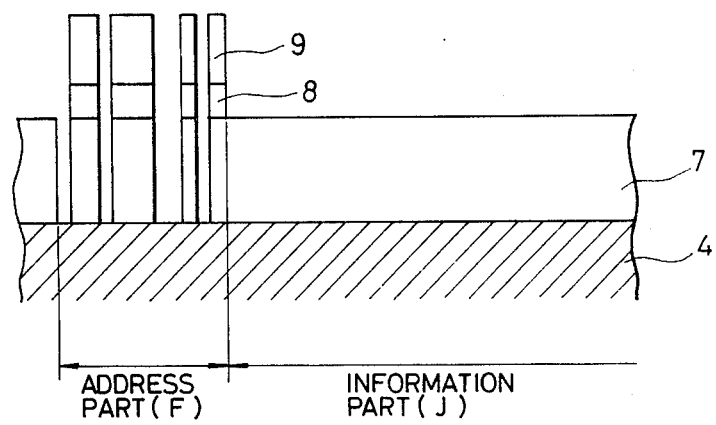
FIG. 11 is also a sectional view of an optical disk with addresses and guide grooves obtained through a second development step.
Figure 12:
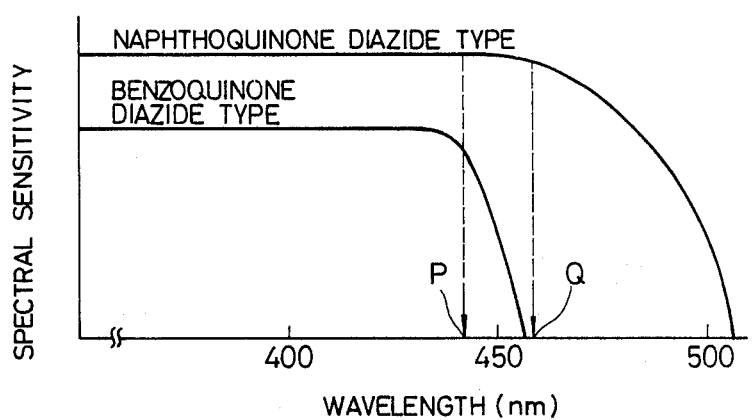
FIG. 12 is a diagram showing spectral sensitivities of two different photoresists employed in a second embodiment of the invention.

FIG. 12 indicates the spectral sensitivities of naphthoquinone diazide photoresist and benzoquinone diazide photoresist at various wavelengths. If the recording apparatus is designed so that the long wavelength laser source 10 emits a laser beam having a wavelength Q and a short wavelength P, then the layers can be shaped as shown in FIGS. 9 through 11 by developing and etching in the same manner as in the first embodiment described above, and an optical disk with addresses and guide grooves formed as desired can be obtained.

In the second embodiment, two different light sources are employed for forming the address pits and the guide grooves, and the diameters of the light spots can be changed as desired. Accordingly, for instance, the guide groove can be made smaller in depth and larger in width than the address pits. For instance, if the aforementioned photoresists AZ-111 and AZ-1350 are employed in combination, the wavelengths P and Q as indicated in FIG. 12 can be obtained by employing an Ar laser (λ=458 nm) as the long wavelength laser source 10 and an He-Cd laser (λ=442 nm) as the short wavelength laser source 11.

The optical disk with addresses and guide grooves thus manufactured can be used if an optical recording material such as a Te metal film is applied directly to the surface. However, in general, first a stamper of metal such as nickel is formed by using the optical disk as a master block, and then a large number of copies of the optical disk are formed, for instance, by injection moulding with the stamper, and are then applied with the optical recording material.

As is apparent from the above description, according to the invention, two photosensitive material layers different in photosensitive characteristic are formed by coating in such a manner that they are formed one on another, and these layers are subjected to exposure under conditions suitable for forming guide grooves and address pits, and are partially removed. Therefore, in the optical disk of the invention, the depths and widths of the guide grooves and the address pits can be set freely and accurately.

We claim:

1. A method for manufacturing an optical disk with address pits and guide grooves comprising the steps of:
    applying to one planar surface of a recording board a first photoresist layer and applying to said first photoresist layer a second photosensitive layer, said first photoresist layer comprising a material sensitive only to recording light having a first wavelength spectrum and said second photoresist layer comprising a material sensitive only to recording light having a second wavelength spectrum different from said first wavelength spectrum;
    selectively subjecting said second photoresist layer to light within said second wavelength spectrum and at an intensity such that the entire thickness of said second layer in selected first areas is exposed;
    selectively subjecting said first photoresist layer in selected second areas, located relative to said selected first areas, to light within said first wavelength spectrum and at an intensity such that the entire thickness of said first layer in said selected second areas is exposed; and
    developing said exposed second layer to create a pattern shaped in accordance with said first area and developing said first layer using the remaining photosensitive material of said second layer as a mask.

2. The method as claimed in claim 1 wherein the first wavelength spectrum is short wave length and the second wave length spectrum is long wavelength.

3. The method as claimed in claim 2 further comprising the steps of:
    forming an intermediate layer between said first and second layers;
    following the steps of exposing and developing said second layer in selected first areas, partially removing said intermediate layer using remaining photosensitive material of said second layer as a mask; and
    partially removing said photosensitive material of said first layer under said removed intermediate layer by exposure and development.

4. The method as claimed in claim 2 wherein exposure within a first wavelength spectrum is provided by a first source of light and exposure within said second wavelength spectrum is provided by a second sources of light and said exposed areas are removed independently of each other, whereby said guide groove can be made smaller in depth and larger in width than the address pits.

5. The method as claimed in claim 4 wherein said first and second sources are lasers.

* * * * *